US 7,142,691 B2

(12) United States Patent
Levy

(10) Patent No.: US 7,142,691 B2
(45) Date of Patent: Nov. 28, 2006

(54) WATERMARK EMBEDDING FUNCTIONS IN RENDERING DESCRIPTION FILES

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 750 days.

(21) Appl. No.: 09/810,000

(22) Filed: Mar. 16, 2001

(65) Prior Publication Data

US 2001/0054150 A1    Dec. 20, 2001

Related U.S. Application Data

(60) Provisional application No. 60/190,481, filed on Mar. 18, 2000, provisional application No. 60/257,822, filed on Dec. 21, 2000.

(51) Int. Cl.
*G06K 9/00* (2006.01)
(52) U.S. Cl. ............ 382/100; 713/176
(58) Field of Classification Search ............ 382/100, 382/232; 380/26, 55, 201, 207, 208, 239, 380/267; 713/176, 178, 179, 181; 370/522, 370/527, 528, 529; 348/460, 461, 465, 466; 386/103, 94, 95; 704/200.1; 381/73.1; 283/72; 399/366; 705/57; 358/3.28
See application file for complete search history.

(56) References Cited

U.S. PATENT DOCUMENTS

| | | | |
|---|---|---|---|
| 5,486,686 A | 1/1996 | Zdybel, Jr. et al. | |
| 5,495,581 A | 2/1996 | Tsai | |
| 5,822,432 A | 10/1998 | Moskowitz | |
| 5,838,458 A | 11/1998 | Tsai | |
| 5,889,868 A | 3/1999 | Moskowitz | |
| 6,122,403 A | 9/2000 | Rhoads | |
| 6,233,684 B1 | 5/2001 | Stefik et al. | |
| 6,334,721 B1 | 1/2002 | Horigane | |
| 6,396,594 B1 | 5/2002 | French | |
| 6,522,770 B1 | 2/2003 | Seder et al. | |
| 6,556,688 B1 * | 4/2003 | Ratnakar | 382/100 |
| 6,591,009 B1 * | 7/2003 | Usami et al. | 382/165 |

(Continued)

FOREIGN PATENT DOCUMENTS

EP        493091        7/1992

(Continued)

OTHER PUBLICATIONS

Bloomberg, "Embedding Digital Data on Paper in Iconic Text," SPIE, vol. 3027, pp. 67-80 (1997).

(Continued)

*Primary Examiner*—Joseph Mancuso
*Assistant Examiner*—Patrick Edwards
(74) *Attorney, Agent, or Firm*—Digimarc Corporation

(57) ABSTRACT

A method for controlling watermark embedding in a media object through the use of a watermark embedding command. In the process of creating the media object, the method includes a watermark embedding command among a set of one or more rendering commands that specify how the media object is to be rendered. For example, certain media signal formats like PCL, PDF, or postscript for images, MIDI and structured audio for audio signals, and MPEG-4 and MPEG-7 for audio and video signals, include descriptors that control how a particular media signal is to be rendered. The watermark embedding command includes a combination of the following items: an identifier used to link to customer or related content information, the customer's web site, the intensity at which to embed the watermark, areas not to embed, batch processing options, printing preferences for images, watermarking embedding methods to use on different media types, formats, or different parts of the media object, and desired rendering quality.

20 Claims, 2 Drawing Sheets

U.S. PATENT DOCUMENTS

| | | | |
|---|---|---|---|
| 6,643,382 B1 * | 11/2003 | Maeda | 382/100 |
| 6,678,389 B1 * | 1/2004 | Sun et al. | 382/100 |
| 6,757,405 B1 * | 6/2004 | Muratani et al. | 382/100 |
| 6,912,294 B1 * | 6/2005 | Wang et al. | 382/100 |
| 2001/0006585 A1 | 7/2001 | Horigane | |
| 2001/0007130 A1 | 7/2001 | Takaragi | |
| 2001/0017704 A1 | 8/2001 | Akiyama | |
| 2001/0023421 A1 | 9/2001 | Numao et al. | |
| 2001/0028725 A1 | 10/2001 | Nakagawa et al. | |
| 2001/0053299 A1 | 12/2001 | Matsunoshita et al. | |
| 2002/0048369 A1 | 4/2002 | Ginter | |
| 2002/0054317 A1 | 5/2002 | Matsunoshita | |
| 2002/0112171 A1 | 8/2002 | Ginter | |
| 2002/0168089 A1 | 11/2002 | Guenther | |
| 2003/0142361 A1 | 7/2003 | Walton | |
| 2003/0219144 A1 | 11/2003 | Rhoads et al. | |

FOREIGN PATENT DOCUMENTS

| | | |
|---|---|---|
| EP | 1156662 | 7/2000 |
| WO | WO 9740619 | 10/1997 |
| WO | WO 01/74053 | 10/2001 |

OTHER PUBLICATIONS

Brassil, "Electronic Marking and Identification Techniques," Proc. Of INFOCOM/94 Conf on Computer, IEEE Commun. Soc Conference, pp. 1278-1287 (1994).

Brassil, "Hiding Information in Document Images," Proceedings of the 1995 Conference on Information Sciences and Systems, pp. 482-489 (1995).

Koch, "Copyright Protection for Multimedia Data," Proc. Of the Int. Conf. On Digital Media and Electronic Publishing, Leeds, U.K., 15 pages (1994).

Macq, "Cryptology for Digital TV Broadcasting," *Proceedings of the IEEE*, vol. 83, No. 6, Jun. 1995, pp. 944-957.

Zhao, "Embedding Robust Labels into Images for Copyright Protection," Proc. Of the International Congress on Intellectual Property Rights for Specialized Information, Knowledge and New Technologies, 10 pages (1995).

* cited by examiner

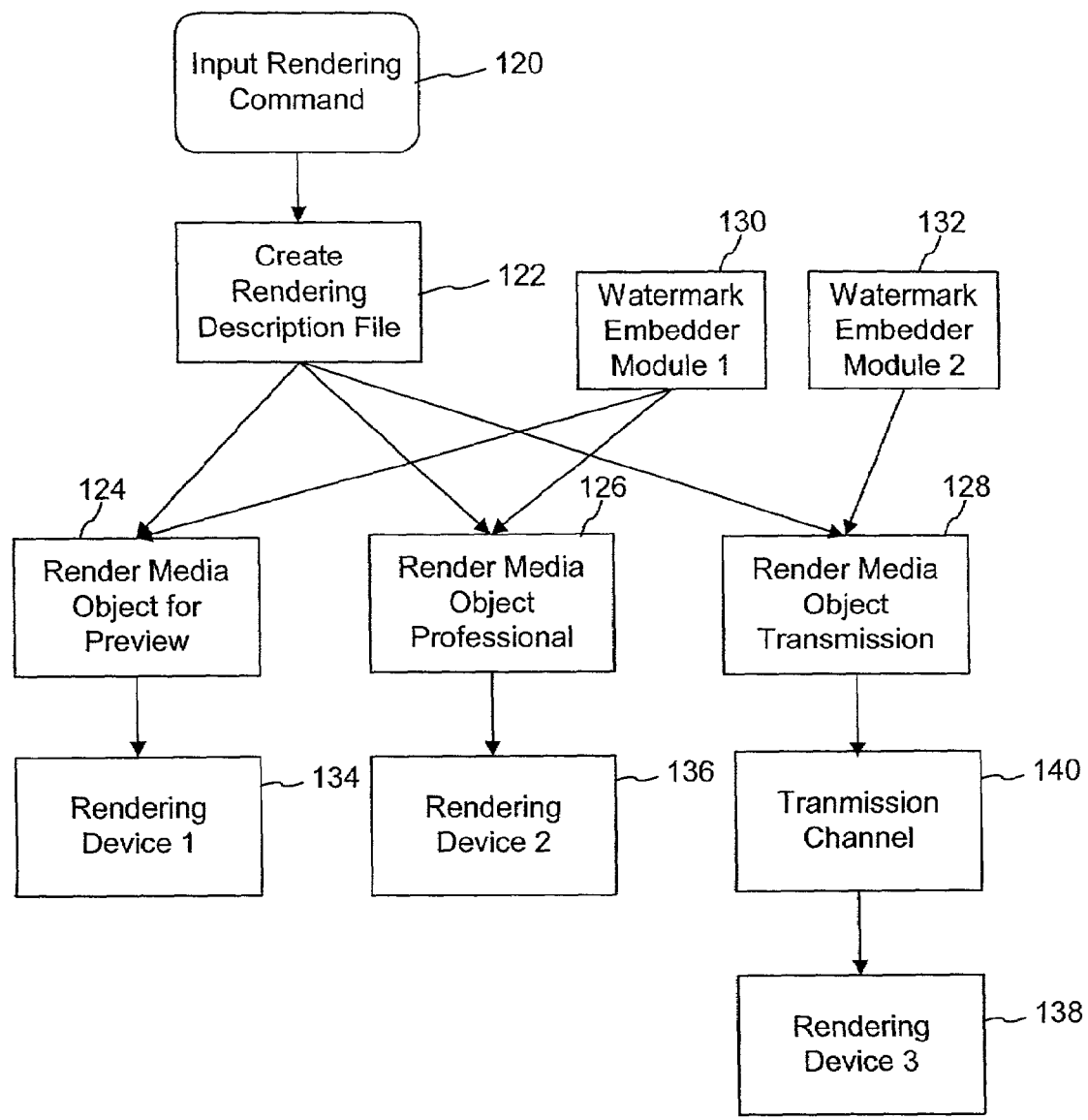

WATERMARK EMBEDDING FUNCTIONS IN RENDERING DESCRIPTION FILES

RELATED APPLICATION DATA

This patent application claims the benefit of U.S. Provisional Patent Application No. 60/190,481, entitled Embedded Data and Data Scrambling Improvements, filed Mar. 18, 2000 by Ken Levy, which is incorporated by reference. This patent application also claims the benefit of U.S. Provisional Patent Application No. 60/257,822, entitled Watermark Systems and Methods, filed Dec. 21, 2000, by Ken Levy et al. which are hereby incorporated by reference.

This patent application is related to U.S. patent application Ser. No. 09/629,401, entitled Management of Document and Other Objects Using Optical devices, filed Aug. 1, 2000, by Seder, Carr, Perry, Graham, and Rhoads, which is hereby incorporated by reference.

This patent application is also related to U.S. patent application Ser. No. 09/706,505, entitled Batch Identifier Registration and Embedding in Media Signals, filed Nov. 2, 2000, by McKinley and Hein, which is hereby incorporated by reference.

TECHNICAL FIELD

The invention relates to steganography, digital watermarking and data hiding within multimedia signals, including still images, audio and video.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 5,862,260, which are hereby incorporated by reference. Watermarking techniques particularly adapted to graphic art and halftone images are set forth in U.S. patent application Ser. Nos. 09/074,034, entitled Methods and Systems for Watermark Processing of Line Art Images, 09/689,226, entitled Halftone Watermarking and Related Applications, and 60/263,987, entitled Halftone Primitive Watermarking and Related Applications, which are hereby incorporated by reference.

In watermarking applications and related literature, digital watermarks are classified as robust, fragile and semi-fragile. A robust watermark refers to a watermark that is designed to survive typical and even malicious processing of the watermarked signal that distorts the watermarked signal and makes it more difficult to reliably detect and read the watermark. A fragile watermark refers to a watermark where the watermark degrades in response to certain forms of processing like printing copying, scanning, compression, etc. Fragile watermarks are typically used in authentication application to detect tampering of a signal. Semi-fragile watermarks combine the concepts of fragile and robust watermarks. These types of watermarks are designed to survive certain types of processing like compression, yet detect tampering like cropping or swapping of signals. Fragile and semi-fragile watermarks may be used to trigger certain actions or control usage of the watermarked content when degradation of the fragile watermark is detected.

In digitally watermarking media signals, such as audio, still images and video, there are a number of challenges and trade-offs. One challenge is to embed the watermark so that it is sufficiently robust for the particular set of attacks anticipated for the application, while making sure that the watermark is sufficiently imperceptible for that application. For some applications, it is not possible to fully anticipate the types of processing that a media object will encounter, even before it is distributed. For example, a music track may be produced and distributed in a number of different formats (different compression rates, different compression codecs, different broadcast formats, etc.). Each of these formats may degrade or distort the watermark differently. In addition, the music track may be rendered using high fidelity audio equipment, or lower quality equipment, giving rise to different perceptual quality constraints. In particular, lower quality rendering enables the watermark to be embedded more robustly because perceptibility constraints on the watermark are less stringent. The same is true for video signals, like movies, television programming, advertisements, etc.

In the case of still images, an image may undergo transformations, such as compression, color conversion, halftoning, etc. before it is finally printed or rendered. Consider, for example, graphic art used in advertisements, packaging, and brochures. Such art imagery may include a collection of a raster images that are combined to form a final image. For a particular design project, the graphic artist creates a piece of graphic art for a customer, typically including a collection of constituent images in different formats. Some of the images may be line art, vector graphics, color halftone or color multi-level per pixel images (in color formats like RGB, CMYK or YUV). The entire image product is described in a job ticket that encapsulates the rendering functions to control the assembly of the constituent images and the printing process.

The customer may want to apply a watermark to the final image product for a variety of applications, such as inserting a customer identifier for tracking purposes, linking the image to the customer's web site, etc. There are two main problems, potentially inter-related. One problem occurs with the content flow and timing of adding the watermark flow. Another problem occurs with adding watermarks to vector graphics. The stage at which the watermark message payload and embedding parameters are defined may not always be the appropriate stage to embed the watermark in the host signal. One place to embed the message payload of the watermark into the graphic art is in the raster interface processing (RIP) stage. In this stage, the constituent images are assembled and converted to a particular halftone image format compatible with the printer. The halftone image format includes one or more color planes of pixel elements that specify the presence or absence of ink at corresponding pixel locations. The RIP stage usually occurs at the Pre-Press house or Printer, and requires the person with the most critical eye for color. In addition, this stage, by definition, results in a complete raster image. The watermark can be defined for vector graphics (or line-art), but is ultimately embedded in a raster image when printed with common modem equipment. The customer doesn't usually interact with the Pre-Press house or Printer, except to possibly proof the image. In addition, these locations are under terrible time and cost constraints and do not want to deal with inefficient and costly customer interactions. Finally, many graphic art pieces contain little or no raster sections; thus, the watermark cannot be added before the art is rasterized at the RIP stage. Despite the difficulty of watermarking prior to rasterizing for printing, it is often necessary to preview the watermarked final image product on a display screen, or desktop printer, which poses the problem of how to embed the watermark for previewing.

If the graphic artist has to add the watermark before the Pre-Press house or Printer, the graphic artist must rasterize the image. This causes two problems. First, the graphic artist must now deliver a file consisting of a large number of bits (i.e. size). Second, the graphic artist is not the best person to deal with the color management required to produce a quality image.

The difficulty is that the customer is already working with the graphic artist and wishes to define the contents of the watermark, but the watermark is ultimately embedded in the rasterized image in the Pre-Press house or Printer. A similar problem exists for other media types like audio and video, where the watermark payload is specified at a stage different than the most appropriate stage for embedding the watermark in the content.

If the image file is a vector graphic, whether rendered for printing as described above, or distributed electronically such as on the web, a participant such as the owner, may want to watermark the vector graphic. The participant wants that watermark to be embedded in the rendered image whenever the vector file is rendered, such as on a computer screen, possible within a wed browser or printer. This allows illegitimate copies, such as copies made with a print screen function, to be identified.

A method for controlling watermark embedding in a media object through the use of a watermark embedding command is described below. In the process of creating the media object, the method includes a watermark embedding command among a set of one or more rendering commands that specify how the media object is to be rendered. For example, certain media signal formats like PCL, PDF, or postscript for images, MIDI and structured audio for audio signals, and MPEG-4 and MPEG-7 for audio and video signals, include descriptors that control how a particular media signal is to be rendered. The watermark embedding command includes a combination of the following items: an identifier used to link to customer or related content information, the customer's web site or store, the intensity at which to embed the watermark, areas not to embed, batch processing options, printing preferences for images, watermarking embedding methods to use on different media types, formats, or different parts of the media object, and desired rendering quality.

The watermark embedding command enables the customer or creator to specify watermark message payload and embedding parameters and preferences, and enables the rendering device to embed the watermark appropriately for a particular rendering process. In the case of graphic art, the customer can preview the watermarked content on the graphic artist's monitor or inexpensive printer, which rasterizes the image for display, embeds the watermark in response to the command, and renders the watermarked image. In addition, the Pre-Press house or Printer, can add and modify the watermark without interacting with the customer, thereby saving time and money.

In general, the watermark embedding command includes the message payload to be embedded and rules or links to how to embed these bits. Thus, the watermark function is implemented according to the desired embedding method when the graphic art is rendered, such as on the screen, printed proofs or final printing plates.

This method is extended to other types of media objects, including audio or music tracks, video sequences, etc. Further features will become apparent with reference to the following detailed description and accompanying drawings.

The objects of watermark embedding commands include the following: watermarks can be embedded in rendering description content, such as vector graphics, MIDI, and structured MPEG audio and video. In addition, watermarks can be embedded at a time and location separate from where and when the watermark and content is rendered. This reduces costs by allowing proper interaction between the content owner and creators, who have different responsibilities and skills.

BRIEF DESCRIPTION OF THE DRAWINGS

FIG. 2 is a diagram illustrating a process for embedding watermarks in media objects using watermark embedding commands.

DETAILED DESCRIPTION

Figure 1:
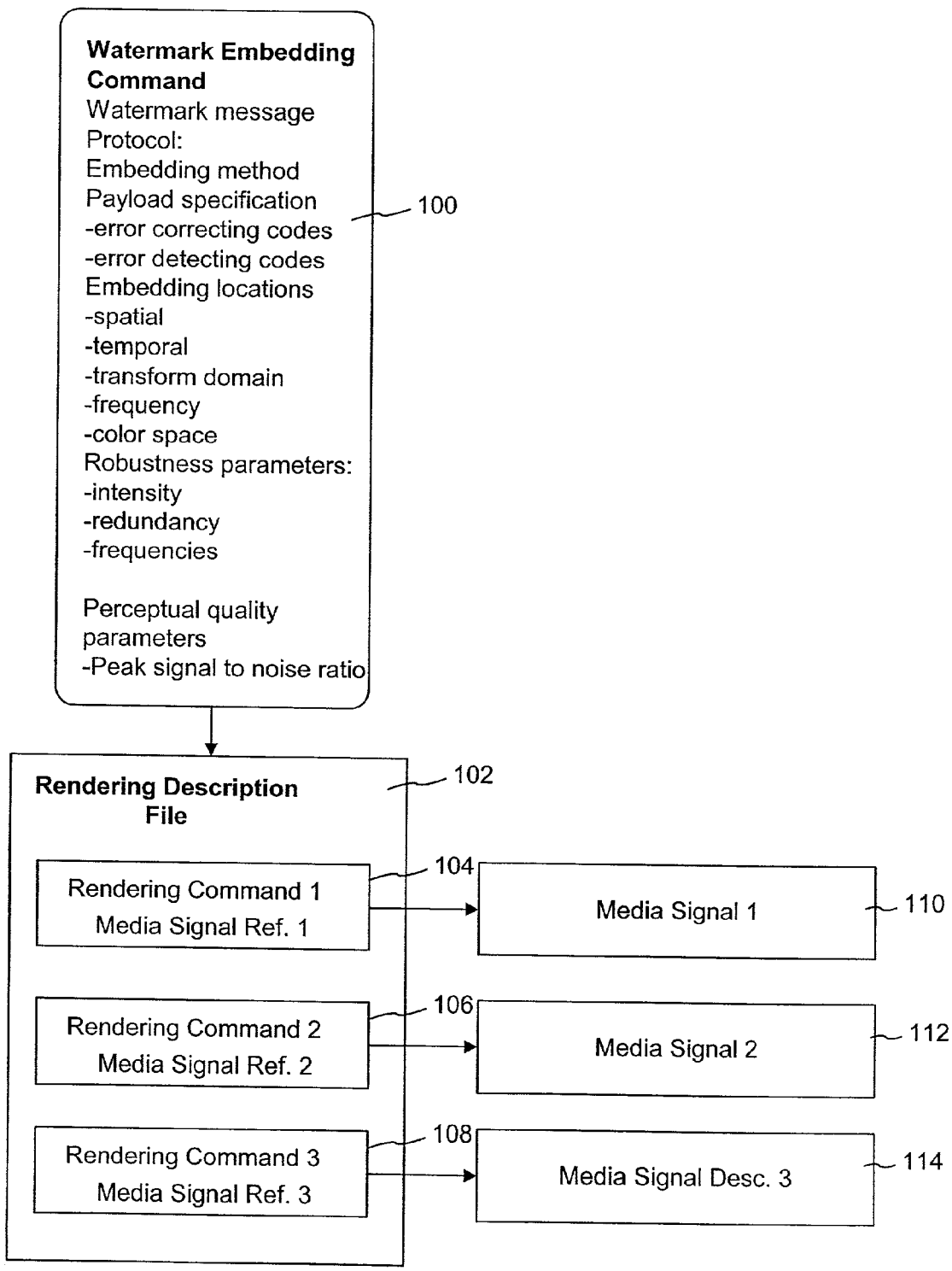
FIG. 1 is a diagram illustrating a watermark embedding function and rendering description file.

Document and other media object generation tools continue to increase in sophistication and complexity. Adobe offers a variety of such tools, including their InDesign software. Watermarking can advantageously be effected in such systems.

In such environments, a document may be created using a variety of tools—most of which can insert a watermark. One program may use as input the output of one or more other programs (i.e., "compositing").

To better handle watermarking in this environment, a watermarking function (e.g., a PostScript-like command) can be provided in the tools. This function is called with parameters specifying the desired features of the watermark information, e.g., payload, robustness level, masks to be used. At rendering time, such as for on-screen viewing, printing proofs, or ripping the final version, the watermark is actually added as digital data. In such environment, the embedder knows the properties of the rendering device, such as the printer, and appropriately adjust its embedding accordingly. With this concept, watermarks are not lost during composite operations, and watermarks can be embedded in vector (or line) art. Moreover, the color manager at the ripping stage may be the best entity to add the watermark.

This idea likewise extends to video—especially MPEG-4 object video, audio—especially MIDI or MPEG-4 structured audio language, and virtual advertisements.

The use of a PostScript-like function to embed a watermark is further detailed in application Ser. No. 09/629,401.

An alternate method is that no desktop tool has watermarking capability, but instead an on-line watermarking server is available to support common image formats. A variety of tools are enabled to submit images to the server with information regarding the desired parameters of the watermark. The server then returns the image to the application. In this way, the burden of integration is virtually eliminated and the registration and marking take place simultaneously.

When watermarking graphic art material, such as packaging, it is desirable to have the graphic designer, rather than the printer, embed the desired watermark for the person or company creating the packing. Having the graphic artist embed the watermark is advantageous because the consumer is already communicating with the artist, and the customer may never need to communicate with the printer. Usually printers are only needed to proof the plates or prototype. In addition, printers don't want extra things to remember, printing is hard enough.

However, much graphic art material remains as line-art (also known as vector graphics) until being rasterized during the printing process, and the state of the art for watermarking is raster based.

A solution is to embed watermark functions in the line-art file, in a similar fashion to how fonts are described with a Bezier curve. The watermark function contains the bits to embed as well as rules how to embed these bits in different elements. The watermark function could be considered as a command in the popular expanded postscript (EPS) format.

For example, when producing text and a watermark is contained in the line-art, the watermark bits could be embedded by slightly adjusting the position, either vertical, horizontal or both, of each letter. Alternatively, the watermark could be embedded by adding or removing bumps, which are too small to see but can be read digitally, on the edges of the letters. Importantly, any data embedding method can be used according to the bits and rules of the watermark function. Similarly, when producing drawing objects, the watermark function could be implemented by embedding the bits in bumps along the edges of the object. Alternatively, when putting a gradient fill inside an object, the watermark function could be implemented by adding more traditional PN sequences within the gradient fill, or modulating halftone dots.

In general, the watermark function contains the bits to be embedded and rules or links to how to embed these bits. Thus, the watermark function is implemented according the desired embedding method when the line-art is rendered, such as on the screen, printer or printing plates.

As noted, the watermarking function may be applied in variety of types of media objects and rendering description languages. FIGS. 1 and 2 illustrate a framework for implementing and using the watermark embedding function as a rendering command. FIG. 1 is a diagram illustrating a watermark embedding command (100) and insertion of the command into a rendering description file (102). The watermark embedding command is specified in a text format or some other binary form compatible with the rendering description file in which it is inserted.

At the time of media signal creation, the user specifies the watermark embedding command and associated parameters. Later, at the time of rendering, the rendering device invokes a watermark embedding module to embed the watermark in the media object according to the watermark embedding command. The watermark command parameters include a combination of parameters describing the watermark message payload, the watermark protocol, the watermark embedding method, the payload specification, the embedding locations, the robustness parameters, and the perceptual quality parameters. Any combination of these and other parameters may be used depending on the application.

The watermark message comprises some number of binary or M-ary symbols. These symbols can represent a variety of types of information related to the media signal in which they are embedded, including, to name a few:

copy control parameters controlling rendering or transfer of the object, identifiers of the media object, its owner, or transactions of the object (user ID, machine ID, storage device ID, etc.), network addresses of related information, programs, web sites, etc.

program or device instructions metadata for the media object an index (or several indices) to a database entry relating to the object that stores the above information or other information such as programs that are executed in response to watermark detection, etc.

The watermark protocol specifies how the watermark message is to be embedded and the meaning of the various symbols in the watermark message. The protocol may be specified using one or more parameters. These protocol parameters include a parameter that specifies the embedding method, such as a pointer to a embedder module or plug-in to be used in the rendering device to embed the watermark. There are several different embedding methods per media type. For image signals including video and still images, the method may include a spatial or frequency domain spread spectrum watermark embedder, a watermark embedder that encodes symbols by adjusting samples or features to quantization levels associated with symbols to be embedded, halftone modulation methods (varying halftone dot shapes, screens, error diffusion thresholds, dot cluster sizes or widths according to changes associated with message symbols, etc.). For audio signals, the method may include temporal or frequency domain spread spectrum watermark embedder, a watermark embedder that encodes symbols by adjusting samples or features to quantization levels associated with symbols to be embedded, a watermark embedder that encodes a collection of masked tones or time/frequency shifted versions of the host signal corresponding to symbols to be embedded, etc. In some cases, the method may be left unspecified so that the rendering device or transmission channel may optimize the watermark method and protocol for that rendering device or channel. In this case, the rendering device or channel has a compatible decoder associated with that device or channel for decoding the watermark. Alternatively, a universal watermark signal or metadata may be used to specify the watermark type for decoding.

The protocol parameters may also include more detailed information about the watermark payload, namely a payload specification. The payload specification may includes items such as the type of error correcting codes to employ, the type of error detection to employ, the number of message symbols (e.g., binary bits) in the payload, encryption keys for encrypting the payload, etc.

The protocol may also specify where to embed the watermark, which is referred to as the "embedding locations" in FIG. 1. The embedding locations include, and are not limited to, spatial, temporal, and transform domain locations to embed the watermark in the host media signal.

The transform domain locations refer to transform domain coefficients or sets of coefficients in particular block size of content. Examples of transform domains include Fourier domain, wavelet domain, DCT, etc. The embedding locations may specify, for example, that the watermark is to be confined to certain frequency ranges in the signal. Also, for images and video, the embedding location may also specify the color plane or planes in which to embed the watermark signal, such as the luminance channel, the blue channel, or some other color channel.

In some applications, the watermark embedder will embed different message payloads in different parts (spatial, temporal, frequency, transform domain portions) of the host media signal. In these cases, the watermark embedding command specifies the parameters for each of the different message payloads, including its embedding location, intensity, fragility (for fragile watermarks), robustness parameters, perceptual quality parameters, redundancy, etc. This enables the watermark embedder module (or modules) to embed combinations of different robust watermarks, robust and fragile watermarks, or fragile watermarks at varying degrees of fragility. In some cases, the message payload may be a single bit, which reduces to the presence or absence of a watermark signal. This single bit may be spread in a signal covering several embedding locations, repeated in several instances of the same signal, or some combination of both.

As noted previously, the embedding locations may be specified in terms of spatial, temporal or transform domain masks that specify the areas for embedding the watermark. The mask is an array of elements each corresponding to an embedding location. For each element, the mask may be associated with other parameters, such as the payload for that location, the robustness for that location, and the perceptual quality for that location. The mask may be designed by the creator of the media object to specify where to, and conversely, where not to embed the watermark, and also to specify the watermark intensity for the areas where it will be embedded.

The robustness and perceptual quality parameters enable the user or application that inserts the embedding command to control the trade-offs between robustness of the watermark and perceptibility. The robustness parameters may be specified in terms of intensity (e.g., watermark signal gain for a particular embedding location), redundancy (e.g., the extent to which the message payload is redundantly encoded across embedding locations to increase its robustness), and frequency locations (e.g., the extent to which the watermark signal is concentrated in lower frequency areas that are more likely to survive transformations of the host signal). Each of these parameters may be specified as a preferred range to enable the embedding module to optimize the watermark for perceptibility and robustness in specified robustness and perceptibility ranges.

Related to the robustness parameter, the watermark embedding command may also specify the level of fragility of the watermark at particular locations in the media signal. Such fragile watermarks are embedded in response to the embedding command. Later at watermark decoding, the presence of the fragile watermark, or its measured strength (e.g., as measured by the error detection rate of a known embedded symbol set, or by threshold levels of detected watermark strength), are used to detect tampering or processing of the watermarked signal.

This type of robustness and perceptual quality specification enables the watermark embedder module to perform iterative embedding with a feedback path to optimize embedding for a particular rendering or transmission device. In this iterative approach, the embedder initially embeds the watermark payload according to the command parameters at lowest robustness and highest perceptual quality, applies a model of degradation for the particular rendering device or transmission channel to the watermarked signal, and then decodes the watermark to measure the detection error rate for the message payload (e.g., the detection error is quantified using a measure of the difference between decoded symbols and expected symbols before error correction decoding is applied). It then repeats another iteration of this process, increasing the robustness slightly with each iteration until the detection error rate is at a satisfactory level. The model of the degradation may be a compression operation, or a signal transformation that simulates the distortion due to digital to analog—and analog to digital conversion, time scaling, affine transformation, etc.

The perceptual quality parameters may be specified using automated measures such as peak signal to noise ratio, which quantifies the distortion of the watermarked signal relative to the un-watermarked signal. The perceptual quality parameter may be specified as an allowable range or as a threshold which should not be exceeded.

A media object creation program inserts the watermark embedding command into the rendering description file 102 as another rendering command. As shown in FIG. 1, the rendering description file includes a collection of rendering commands (104, 106, 108) that reference media signals (110, 112) or descriptions of media signals (e.g., 114, such as the case for vector graphics file) to which the rendering commands are to be applied. This file may then be stored for later use, sent to a rendering device, or distributed over a transmission channel.

There are a variety of potential formats for the rendering description file, such as postscript, PCL, EPS, PDF, job tickets, vector graphics, etc. for images and documents, structured audio and MIDI for audio, and MPEG-4 or MPEG-7 for video and audio.

FIG. 2 is a process for embedding watermarks in media objects using watermark embedding commands. The process begins when a user or application program inserts the watermark embedding function as a rendering command (120) into the rendering description file (122). Later, when the media object described in the rendering description file is prepared for rendering, the rendering process (124, 126, 128) reads the watermark embedding command, and invokes the appropriate watermark embedding module (e.g., 130, 132) to embed the watermark according to the parameters specified in the embedding command (120). The watermark embedding module is adapted for the particular rendering device (134, 136, 138) that will render the signal or the transmission channel (140) that will communicate the signal. To avoid degradation to the signal due to the transmission channel, it can be sent through the transmission channel as a rendering description file and later rendered and embedded with the watermark at the rendering device.

For images, the rendering process may be implemented in a display driver, printer driver, or plug-in to the display or printer driver. It may also be implemented in the printer hardware and specifically integrated into the halftoning process so that the watermark is particularly adapted to the halftone process and is embedded into the image after or while it is rasterized to a halftone image. This technique applies to a variety of halftone processes including ordered dithering (e.g., blue noise masks, clustered dot halftones, etc.), error diffusion, stochastic screening, etc. Examples of halftone watermark embedding methods include:

1. Adding a perceptually adapted spread spectrum watermark signal to an image in multi-level per pixel format at the halftone dot resolution before converting the image to a halftone image. The watermark signal is created by convolving or multiplying the message payload with a pseudo-random carrier signal, and then scaling the carrier signal based on the masking attributes of the image;

2. Modulating the error threshold used in error diffusion halftoning according to a perceptually adapted spread spectrum watermark signal;

3. Modulating line widths of halftone dots;

4. Modulating halftone cluster shapes and sizes to embed a watermark signal into a halftone image; or modulating halftone screens according to predetermined relationship between. For more information about watermark embedding methods for halftone images, see U.S. Pat. Nos. 09/074,034, entitled Methods and Systems for Watermark Processing of Line Art Images, 09/689,226, entitled Halftone Watermarking and Related Applications, and 60/263,987, entitled Halftone Primitive Watermarking and Related Applications, which are hereby incorporated by reference.

For images, audio and video, the rendering process is implemented in media object generation tools used to transform the signal into a format for distribution, broadcast, or transmission. In these cases, the signal transformation process selects the embedding method and parameters that adapt the robustness of the embedded watermark and perceptual quality of the rendered watermarked signal for the particular rendering process or transmission channel. For example, an audio processor renders a music signal and embeds the watermark payload at a robustness level appropriate for the distribution, broadcast or transmission format. Similarly, a video processor renders a video signal and embeds the watermark payload at a robustness level appropriate for the distribution, broadcast or transmission format.

The watermark function can specify that the watermark be embedded as part of the signal formatting process, such as part of the process of compressing the image, video or audio signal. This enables the watermark module to interact with the compression process to embed the watermark so that it is adapted to that format, e.g., embedding in the compressed data stream or partially compressed stream. The compression rate of the signal can be adaptively set by determining the greatest extent of compression where the watermarked signal still survives based on an error detection measure. Similarly, the perceptual quality parameters may be used to tune the compression process so that the compression rate is selected that maintains the desired perceptual quality of the signal and the robustness level of the watermark signal.

Alternatively, the watermark function can specify that the watermark be embedded after it is converted to a particular format for rendering or transmission (e.g., embedded after compression, or conversion to a broadcast format). The rendering or transmission channel provides robustness and perceptual quality parameters about that rendering process or transmission channel to the embedder module so that it can optimize the watermark embedding for the particular rendering process or transmission channel. In particular, it specifies the watermark robustness, e.g., intensity, or quality constraints that the watermark embedder must adhere to while embedding the payload specified in the watermark embedding command.

The watermark embedder module queries the rendering process, device or transmission channel for its robustness and perceptual quality attributes. If the quality requirements are lower, then the embedder can increase the robustness of the watermark within an allowable range specified by the watermark embedding command parameters. Conversely, if the quality requirements are higher, then the embedder can select the lowest allowable robustness level specified in the watermarking command to embed the watermark so as to minimize degradation to perceptual quality due to the watermark. The same process can be applied to tune the embedding operation based on the robustness attributes of the rendering process or transmission channel. If the rendering process is expected to substantially degrade the watermark's detectability, then the embedder can select the most robust level for the watermark within the allowable range of the watermark embedding command.

Rather than querying the rendering device or channel, the watermark embedding command can be designed to select automatically the preferred watermark embedding method for that device or channel.

The watermark embedding function is particularly well suited for controlling the embedding of watermarks in vector graphics used in virtual advertising for streaming media, like streaming video. The virtual advertising is a vector graphic such as a logo that is superimposed on a video sequence when the streaming video is rendered in a receiving device, such as television equipped with a set top box or a personal computer on the Internet. This vector graphic file defining the virtual advertising can include a watermark embedding command as described above. At rendering time when the vector graphic is rendered, a watermark embedder module at the receiver embeds a watermark onto the vector graphic. This vector graphic can be used as a trigger for interactive TV applications wherever that video travels. For example, the user clicks on (or otherwise selects the logo displayed on the video screen with a cursor control device) to request interactive information such as a web page or to order a product or service when playing previously recorded or live content through a personal video recorder like a Tivo machine. The watermark in the logo is then decoded and a payload is extracted from it that indexes a database entry. The database returns the interactive information (URL, HTML, web page, etc.) or some other programmatic code that executes on the user's set-top box or computer and enables the user to buy the advertised product. As illustrated in this example, the watermark embedding command may be specified for content that includes a combination of different media signals like video, vector graphics, and audio, that get combined at rendering time in the receiving device.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method for controlling embedding of a digital watermark in a media object, comprising:
   receiving a watermark embedding function specifying watermark embedding parameters, including watermark intensity and message payload for the media object;
   inserting the watermark embedding function into a rendering description file for the media object, the rendering description file including commands specifying how the media object is to be rendered, the media object representing a media signal; and
   at rendering time, reading and executing the watermark embedding function to steganographically embed the watermark message payload into the media object by varying the media signal according to the watermark intensity.

2. The method of claim 1 wherein the media object comprises graphic art including a collection of two or more images in different formats.

3. The method of claim 1 wherein the media object comprises a music signal, and the steganographic embedding process is adapted to the robustness or perceptual quality parameters selected at the rendering time.

4. The method of claim 1 including:
   providing two or more different watermark embedding modules, each adapted for different rendering processes or transmission channels, the watermark embedding modules being selected at rendering time depending on the rendering process or transmission channel to which the media object is to be applied.

5. The method of claim 1 wherein the watermark embedding function specifies the embedding locations of the watermark.

6. The method of claim 1 wherein, at rendering time, the steganographic embedding process selects the embedding locations of the watermark depending on the rendering process.

7. The method of claim 1 wherein the media object comprises an image, and the steganographic embedding process embeds the watermark message payload into the image after the image is rasterized into a format compatible with a printer on which the image is to be printed.

8. The method of claim 1 wherein the watermark message payload is embedded in the image after it is converted into a halftone image by a halftoning process compatible with the printer on which the image is to be printed.

9. A method for controlling embedding of a digital watermark in a media object, comprising:
   receiving a watermark embedding function specifying watermark embedding parameters, including watermark intensity and message payload;
   inserting the watermark embedding function specifying into a rendering description file; and
   at rendering time, reading the wtermark embedding function and steganographically embedding the watermark message payload into the media object at the watermark intensity;
   wherein the steganographic embedding process includes:
   iteratively embedding the message payload in each iteration; and
   analyzing an error detection rate of the message payload in each iteration; and
   adjusting a robustness parameter of the embedding process for at least one of the iterations so that the error detection rate is at an acceptable level.

10. A method for controlling embedding of a digital watermark in a media object, comprising:
    receiving a watermark embedding function specifying a watermark embedding parameters for the media object;
    inserting the watermark embedding function into a rendering description file for the media object, the rendering description file including commands specifying how the media object is to be rendered, the media object representing a media signal; and
    at rendering time, reading the watermark embedding function and steganographically embedding the watermark message payload into the media object by varying adjustments made to embed the watermark message payload in the media signal depending on the type of rendering process, the watermark embedding function enabling the embedding to be applied differently to different rendering processes.

11. A media object processing system comprising:
    input means for enabling a user to specify rendering commands for a media object, including a watermark embedding function to be applied to the media object, the watermark embedding function including parameters controlling embedding of a watermark message payload in the media object;
    means for creating a rendering description file describing how to render the media object, the means for creating a rendering description file in communication with the input means for receiving the rendering commands into the rendering description file, including the watermark embedding function to be applied to the media object according to a rendering process, the application of the embedding function varying with the rendering process including varying adjustments of the media object with the rendering process to embed the watermark message payload in the media object; and
    a watermark embedder module for steganographically embedding the watermark message payload into the media object based on the watermark embedding function in the rendering description file.

12. The system of claim 11 where in the system is operable to select different embedding modules for different rendering processes.

13. The system of claim 11 wherein the media object comprises graphic art that is at least in part specified by a rendering command that has not be converted into a rasterized image when the watermark embedding function is inserted in the rendering description file.

14. The system of claim 11 wherein the media object comprises structured audio represented, at least in part, by a rendering command that has not been converted to an audio signal when the watermark embedding function is inserted in the rendering description file.

15. The system of claim 11 wherein the media object comprises rendering commands specifying how to create a video sequence that have not been converted to a video signal when the watermark embedding function is inserted in the rendering description file.

16. A media object processing system comprising:
    input means for enabling a user to specify rendering commands for a media object, including a watermark embedding function to be applied to the media object, the watermark embedding function including parameters controlling embedding of a watermark message payload in the media object;

means for creating a rendering description file describing how to render the media object; and a watermark embedder module for steganographically embedding the watermark message payload into the media object; and wherein the embedder module is operable to iteratively embed the watermark message payload in the media object in two or more iterations, and with each iteration, analyzing an error detection rate of the message payload to adapt robustness of the watermark.

17. The system of claim 16 wherein the watermark embedder module applies a degradation process to a watermarked media signal output from an iteration before analyzing the error detection rate.

18. A computer readable medium having a rendering description file for a media object, the medium comprising:

one or more rendering commands in the file describing how to render the media object; and a watermark embedding function specifying how to embed a watermark message payload into the media object, wherein adjustments made to embed the watermark message payload vary within the rendering process.

19. The computer readable medium of claim 18 wherein the rendering description file includes a rendering command describing how to create a rasterized image, the watermark embedding function specifying how to embed the watermark message in the rasterized image.

20. The computer readable medium of claim 19 wherein the watermark embedding function including a watermark intensity parameter and embedding locations specifying where and at what intensity to embed the watermark message in the rasterized image.

* * * * *